US007848918B2

(12) United States Patent
Li et al.

(10) Patent No.: US 7,848,918 B2
(45) Date of Patent: Dec. 7, 2010

(54) ABBREVIATION EXPANSION BASED ON LEARNED WEIGHTS

(75) Inventors: Hua Li, Beijing (CN); Song Huang, Beijing (CN); Zheng Chen, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1097 days.

(21) Appl. No.: 11/538,770

(22) Filed: Oct. 4, 2006

(65) Prior Publication Data

US 2008/0086297 A1    Apr. 10, 2008

(51) Int. Cl.
G06F 17/27 (2006.01)
G06F 17/21 (2006.01)
G10L 21/00 (2006.01)

(52) U.S. Cl. .......................... 704/9; 704/10; 704/270.1
(58) Field of Classification Search ........................ None
See application file for complete search history.

(56) References Cited

U.S. PATENT DOCUMENTS

| | | | |
|---|---|---|---|
| 5,623,406 | A | 4/1997 | Ichbiah |
| 5,634,084 | A | 5/1997 | Malsheen et al. |
| 6,314,399 | B1 | 11/2001 | Deligne et al. |
| 6,385,629 | B1 | 5/2002 | Sundaresan et al. |
| 6,678,415 | B1 | 1/2004 | Popat et al. |
| 6,934,767 | B1 | 8/2005 | Jellinek |
| 6,966,030 | B2 | 11/2005 | Ashford et al. |
| 7,028,038 | B1 | 4/2006 | Pakhomov |
| 7,089,188 | B2 | 8/2006 | Logan et al. |
| 7,136,876 | B1 * | 11/2006 | Adar et al. ............... 707/104.1 |
| 7,236,923 | B1 * | 6/2007 | Gupta ........................... 704/9 |
| 7,536,297 | B2 * | 5/2009 | Byrd et al. .................. 704/10 |

2002/0152064 A1    10/2002    Dutta et al.

OTHER PUBLICATIONS

Gudes, "Abbreviation Expansion in Schema Matching and Web Integration", Proceedings of the IEEE/WIC/ACM International Conference on Web Intelligence, Feb. 2004.*
Terada et al., "Automatic expansion of abbreviations by using context and character information", Information Processing and Management 40, pp. 31-45, 2004.*
Xu et al., "A Machine Learning Approach to Recognizing Acronyms and Their Expansion", Proceedings of the Fourth International Conference on Machine Learning and Cybernetics, Aug. 18-21, 2005.*
Zhang, "An Introduction to Support Vector Machines and Other Kernel-Based Learning Methods", AI Magazine, vol. 22, No. 2, 2001.*

(Continued)

*Primary Examiner*—Brian L Albertalli
(74) *Attorney, Agent, or Firm*—Perkins Coie LLP

(57) ABSTRACT

A method and system for identifying expansions of abbreviations using learned weights is provided. An abbreviation system generates features for various expansions of an abbreviation and generates a score indicating the likelihood that an expansion is a correct expansion of the abbreviation. A expansion with the same number of words as letters in the abbreviation is more likely in general to be a correct expansion than an expansion with more or fewer words. The abbreviation system calculates a score based on a weighted combination of the features. The abbreviation system learns the weights for the features from training data of abbreviations, candidate expansions, and scores for the candidate expansions.

17 Claims, 13 Drawing Sheets

OTHER PUBLICATIONS

Acronym Dictionary, http://www.acronymdictionary.co.uk/acronymae.html, [last accessed May 24, 2007].

Acronym Finder, http://www.acronymfinder.com, [last accessed May 24, 2007].

Acronym Guide, http://www.acronym-guide.com/, [last accessed May 24, 2007].

Beigbeder, Michel and Annabelle Mercier, "An Information Retrieval Model Using the Fuzzy Proximity Degree of Term Occurences," SAC'05, Mar. 13-17, 2005, Santa Fe, New Mexico, © 2005 ACM.

Brown, Peter F. et al., "A Statistical Approach to Machine Translation," Computational Linguistics, vol. 16, No. 2, Jun. 1990, pp. 79-85.

Church, Kenneth Ward, "A Stochastic Parts Program and Noun Phrase Parser for Unrestricted Text," 2nd Conference on Applied Natural Language Processing, 1988, pp. 136-143.

Clarke, Charles L. A. et al., "Shortest Substring Ranking (MultiText Experiments for TREC-4)," 4th Text Retrieval Conference, 1995.

Deligne, Sabine and Frederic Bimbot, "Language Modeling by Variable Length Sequences: Theoretical Formulation and Evaluation of Multigrams," ICASSP'95, pp. 169-172, © 1995 IEEE.

Hawking, David and Paul Thistlewaite, "Proximity Operators—So Near and Yet So Far," Dec. 6, 1995, 4th Text Retrieval Conference, 1995.

Jones, S. et al., "Peeling the Onion: Okapi System Architecture and Software Design Issues," Journal of Documentation, vol. 53, No. 1, Jan. 1997, pp. 58-68.

Kernighan, Mark D. et al., "A Spelling Correction Program Based on a Noisy Channel Model," 13th International Conference on Computational Linguistics, 1990, pp. 205-210.

Larkey, Leah S. et al., "Acrophile: An Automated Acronym Extractor and Server," Digital Libraries, San Antonio, Texas, © 2000 ACM, pp. 205-214.

Pustejovsky, James et al., "Linguistic Knowledge Extraction from Medline: Automatic Construction of an Acronym Database," MedInfo, 2001, http://medstract.org/papers/bioinformatics.pdf.

Rasolofo, Yves and Jacques Savoy, "Term Proximity Scoring for Keyword-Based Retrieval Systems," Advances in Information Retrieval: 25th European Conference on IR Research, ECIR, 2003, Italy, © Springer-Verlag Berlin Heidelberg 2003, pp. 207-218.

Shen, Dou et al., "Text Classification Improved through Automatically Extracted Sequences," Proceedings of the 22nd International Conference on Data Engineering, 2006.

Smola, Alex J., GMD and Bernhard Scholkopf, GMD, "A Tutorial on Support Vector Regression," NeuroCOLT2 Technical Report Series, NC2-TR-1998-030, Oct. 1998.

Srihari, Rohini K. and Charlotte M. Baltus, "Combining Statistical and Syntactic Methods in Recognizing Handwritten Sentences," In AAAI Symposium: Probabilistic Approaches to Natural Language, 1992, pp. 121-127.

The Canonical Abbreviation/Acronym List, http://www.astro.umd.edu/~marshall/abbrev.html, [last accessed May 24, 2007].

Toole, Janine, "A Hybrid Approach to the Identification and Expansion of Abbreviations," 2000, http://scholar.google.com/scholar?hl=en&lr=&q=cache:0lfRYRpPaKkJ:data.cstr.ed.ac.uk/internal/library/proceedings/2000/riao2000/Thursday/61DO2.pdf+acronym+expansion.

WWWAAS, http://www.ucc.ie/cgi-bin/acronym, [last accessed May 24, 2007].

Yi, Jeonghee and Neel Sundaresan, "Mining the Web for Acronyms Using the Duality of Patterns and Relations," WIDM99, Kansas City, MO, © ACM 1999, pp. 48-52.

* cited by examiner

US 7,848,918 B2

ABBREVIATION EXPANSION BASED ON LEARNED WEIGHTS

BACKGROUND

Abbreviations are used extensively in a variety of domains as replacements for their expansions. As used in this specification, an abbreviation refers to a shortened form of a phrase that is derived from letters of the phrase. For example, "UN" is an abbreviation for "United Nations," "XML" is an abbreviation for "extensible Markup Language," "PAC" is an abbreviation for "Political Action Committee," and "codec" is an abbreviation for "Coder/Decoder" or "Compressor/Decompressor." An abbreviation may or may not be an acronym, which is generally considered to be an abbreviation that is derived from the initial letters of a phrase. For example, "PAC" is an acronym derived from "Political Action Committee," and "Sgt." is an abbreviation, but not an acronym, derived from "Sergeant."

Abbreviations allow a writer in a specific domain to effectively convey concepts without burdening a reader experienced in the domain with the full expansion. For example, in the field of biochemistry the abbreviation "DNA" conveys the concept of "deoxyribonucleic acid" without the cumbersome expansion. Because abbreviations are so pervasive in some domains, it can be difficult for a reader, even one experienced in the domain, to understand the expansion of all abbreviations. In addition, many abbreviations have multiple expansions within a domain and between domains. For example, in the domain of human resources, the abbreviation "PTO" may stand for "Paid Time Off" or "Personal Time Off." The abbreviation "PTO" may also stand for "Power Take-Off" in the domain of farm machinery, for "Patent and Trademark Office" in the domain of patent law, and for "Parent Teacher Organization" in the domain of education.

Many web-based abbreviation dictionaries are available to assist users in determining the meaning of abbreviations. To use these dictionaries, a user inputs the abbreviation and receives possible expansions for the abbreviation. One abbreviation dictionary reports 73 possible expansions for the abbreviation "PTO." These abbreviation dictionaries are typically built by human editors who review published documents for abbreviations and their expansions. To ensure that the abbreviation dictionaries are up to date, some dictionaries allow users to submit new abbreviations and their expansions. Some of these abbreviation dictionaries may have editors who carefully review each submission and determine whether it should be added to the dictionary, while other abbreviation dictionaries simply add submissions to the dictionary without any editorial review. At least one abbreviation dictionary uses information retrieval techniques and heuristics to identify expansions for abbreviations.

The use of human editors to maintain an abbreviation dictionary presents several problems. First, it can be time-consuming and expensive to manually create an abbreviation dictionary. Second, because so many documents are being published on a daily basis, it is virtually impossible for human editors to manually identify all new abbreviations and their expansions. The use of heuristics for automatically maintaining an abbreviation dictionary also presents problems. First, the accuracy of the abbreviation expansions depends on the effectiveness of the heuristics, which in general cannot perform as well as a human editor. Second, it is difficult to extend such heuristics to account for new types of abbreviations such as "XML" for "extensible Markup Language" in which the initial letter of a word of an expansion is not used, but a non-initial letter is used.

SUMMARY

A method and system for identifying expansions of abbreviations using learned weights is provided. An abbreviation system generates features for various expansions of an abbreviation and generates a score indicating the likelihood that an expansion is a correct expansion of the abbreviation. An expansion with the same number of words as letters in the abbreviation is more likely in general to be a correct expansion than an expansion with more or fewer words. The abbreviation system calculates a score based on a weighted combination of the features. The abbreviation system learns the weights for the features from training data of abbreviations, candidate expansions, and scores for the candidate expansions. To learn the weights, the abbreviation system generates features for each candidate expansion and inputs a score indicating the likelihood that the candidate expansion is a correct expansion for an abbreviation. The abbreviation system then uses a learning technique to learn the weights for the various features. The abbreviation system can then score the candidate expansions for an abbreviation by generating the features and calculating their scores from a weighted combination of the features.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for identifying expansions of abbreviations using learned weights is provided. In one embodiment, an abbreviation system generates features for various expansions of an abbreviation and generates a score indicating the likelihood that a candidate expansion is a correct expansion of the abbreviation. For example, one feature may be derived from the number of letters in the abbreviation and the number of words in a candidate expansion. A candidate expansion with the same number of words as letters in the abbreviation is more likely in general to be a correct expansion than an expansion with more or fewer words. The abbreviation system calculates a score based on a weighted combination of the features. For example, each feature may represent a numeric value (e.g., difference between number of letters in the abbreviation and number of words in the candidate expansion) and the score may be a weighted linear combination of the numeric values. The abbreviation system learns the weights for the features from training data of abbreviations, candidate expansions, and scores for the candidate expansions. To learn the weights, the abbreviation system generates features for each candidate expansion and inputs a score indicating the likelihood that the candidate expansion is a correct expansion for an abbreviation. The abbreviation system then uses a learning technique such as linear regression, logistics regression, or support vector regression to learn the weights for the various features. The abbreviation system can then score the candidate expansions for an abbreviation by generating the features and calculating their scores from a weighted combination of the features. In this way, the abbreviation system is provided with features that may be relevant to abbreviation expansions and learns the effectiveness of each feature at representing a correct expansion of an abbreviation.

Figure 1:
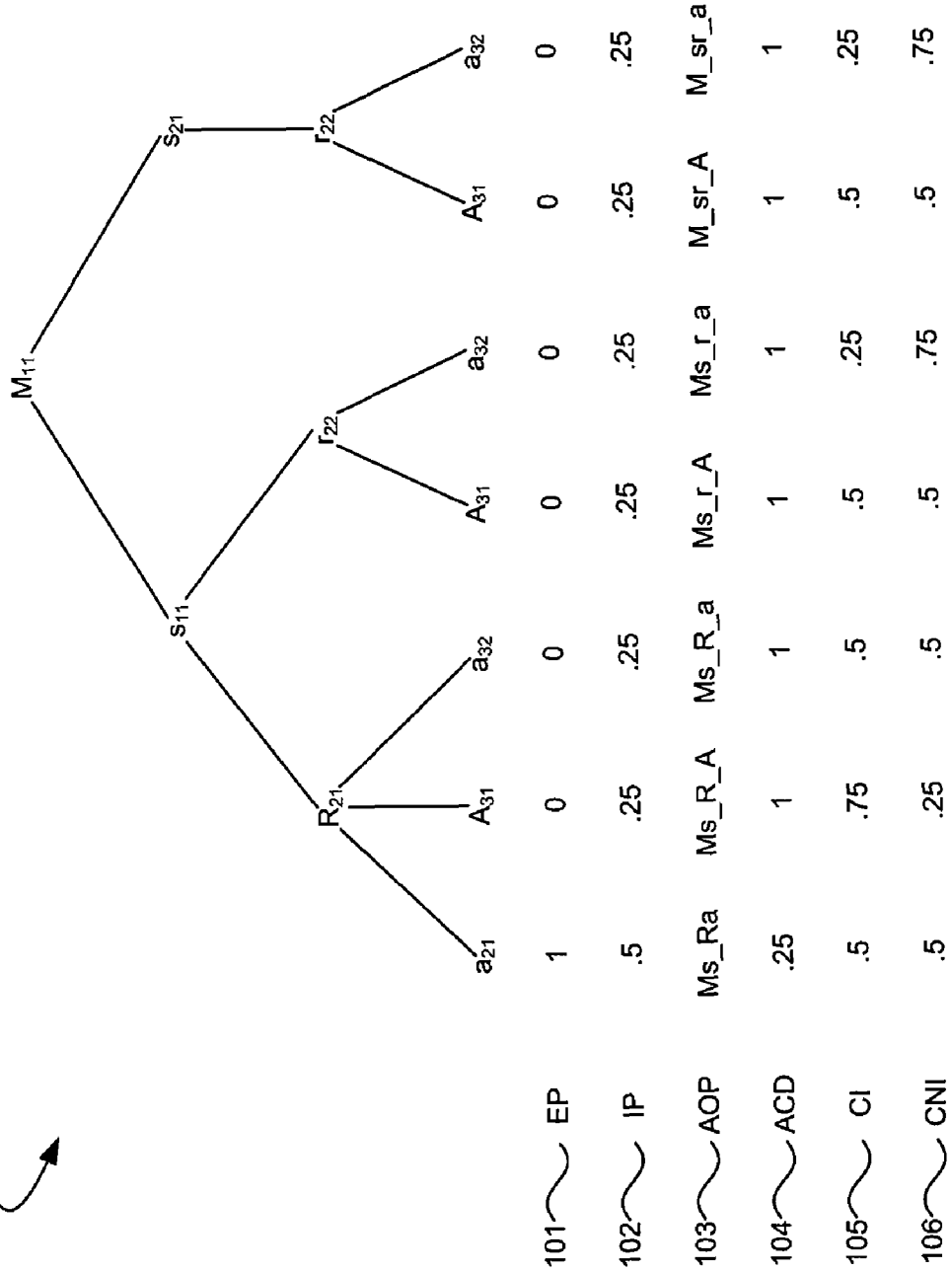
FIG. 1 illustrates various mappings of a candidate expansion to an abbreviation.

In one embodiment, the abbreviation system identifies expansions for an abbreviation by submitting the abbreviation as a query to a search engine service. The search engine service provides search results that include links to documents relating to the abbreviation along with snippets from those documents. A snippet is typically a passage extracted from the document relating to the abbreviation. The abbreviation system then identifies candidate expansions from the passages. The candidate expansions may be phrases of less than a certain length. For example, if the abbreviation has four letters, then the candidate expansions may be all phrases less than eight words. Each candidate expansion may have one or more mappings to the letters of the abbreviation. FIG. 1 illustrates various mappings of a candidate expansion to an abbreviation. In the example, the candidate expansion is "Microsoft Research Asia" and the abbreviation is "MSRA." An expansion tree 100 lists possible mappings of the abbreviation to the candidate expansion. The first subscript of a letter represents the word of the candidate expansion that contains the letter, and the second subscript of a letter represents the occurrence of that letter in the word. For example, R21 represents the first r in the second word (e.g., Research), and r22 represents the second r in the second word (e.g., Research). The mapping (M11, s11, R21, a21) represents a mapping to the underlined letters in "Microsoft Research Asia." The abbreviation system generates a score for each mapping of the candidate expansions and ranks candidate expansions based on the scores of their mappings. For example, the candidate expansion of "Microsoft Research Asia" for "MSRA" will likely have a higher score than the candidate expansion of "Microsoft Research" for "MSRA." Alternatively, the abbreviation system may score only one mapping for each candidate expansion. In such a case, the abbreviation system may rank the mappings and select the mapping with the highest rank to represent the candidate expansion. For example, the abbreviation system may rank mappings with only one letter per word higher than mappings with multiple letters per word.

In one embodiment, the abbreviation system generates features to represent various relationships between an abbreviation and a candidate expansion. The abbreviation system uses an external proximity ("EP") feature to represent the difference between the number of words of the candidate expansion and the number of words enveloped by a mapping. A candidate expansion with a mapping that envelops all of its words is more likely in general to be correct than a mapping with an extra external word (i.e., a word of the candidate expansion that is outside of the words enveloped by the mapping). For example, the mapping of "MSRA" to "Microsoft Research Asia" as indicated by the underlined letters is more likely correct than the mapping to "Microsoft Research Asia" because the latter mapping has the extra word "Asia." The external proximity features for the mappings of FIG. 1 are shown in line 101.

The abbreviation system uses an internal proximity ("IP") feature to represent a normalized difference between the number of words enveloped by a mapping and the length of the abbreviation. A mapping of a candidate expansion that envelops the same number of words as letters in the abbreviation is more likely correct than a mapping that envelops fewer words than letters in the abbreviation. For example, the mapping of "MSRA" to the candidate expansion of "Microsoft Research in Asia" as indicated by the underlined letters may be more likely correct than a mapping to the candidate expansion of "Microsoft Research Asia" because the number of words enveloped by the first mapping is the same as the number of letters in the abbreviation. The internal proximity feature is thus the absolute value of difference between the number of words enveloped by a mapping and the number of letters in the abbreviation, divided by the number of letters in the abbreviation. The internal proximity features for the mappings of FIG. 1 are shown in line 102.

The abbreviation system uses an abbreviation character distribution ("ACD") feature to measure the distribution of letters of the abbreviation through a candidate expansion. A mapping with a distribution of one letter of an abbreviation to each successive word of the candidate expansion is more likely a correct mapping than one with multiple letters mapping to a word or one with no letter mapping to a word. To generate the abbreviation character distribution feature, the abbreviation system uses an abbreviation occurrence pattern ("AOP"). An abbreviation occurrence pattern includes each letter of the abbreviation along with underscores to indicate transitions between words. For example, the abbreviation occurrence pattern for "MSRA" in the mapping "Microsoft Research Asia" as indicated by the underlined letters is "Ms_R_A" and for "MSRA" in the mapping "Microsoft Research Asia" is "M_s_r_A." The abbreviation occurrence patterns for the mappings of FIG. 1 are shown in line 103. The abbreviation character distribution feature is the normalized square of the difference between the length of the abbreviation occurrence pattern and the number of letters of the abbreviation. The square is normalized by dividing by the number of letters in the abbreviation. Thus, the abbreviation character distribution feature for "Ms_R_A" is 1 (i.e., $((6-4)^2)/4$) and for "M_s_r_A" is 2.25 (i.e., ((7−4)^2)/4). The abbreviation character distribution features for the mappings of FIG. 1 are shown in line 104.

The abbreviation system uses the capital as initial ("CI") feature to measure how many capital letters of the abbreviation correspond to initial letters of words in a candidate expansion. A mapping that maps capital letters of an abbreviation to initial letters of words of a candidate expansion is more likely correct than a mapping that maps capital letters to non-initial letters of word. For example, the mapping of "MSRA" to "Microsoft Research Asia" is more likely correct than the mapping of "MSRA" to "Microsoft Research Asia" because the first mapping maps "A" to the initial letter of "Asia." The capital as initial feature is a count of the number of capital letters of the abbreviation that map to initial letters of words of the candidate expansion divided by the number of letters of the abbreviation. The capital as initial features for the mappings of FIG. 1 are shown in line 105.

The abbreviation system uses the capital as non-initial ("CNI") feature to measure how many capital letters of the abbreviation correspond to non-initial letters of words in a candidate expansion. A mapping that maps capital letters of an abbreviation to non-initial letters of words of a candidate expansion is less likely correct than a mapping that maps capital letters to initial letters of word. For example, the mapping of "MSRA" to "Microsoft Research Asia" is less likely correct than the mapping of "MSRA" to "Micro Soft Research Asia" because the capital "S" in the first maps a non-initial letter of "Microsoft." The capital as non-initial feature is a count of the number of capital letters of the abbreviation that map to non-initial letters of words of the candidate expansion divided by the number of letters of the abbreviation. The capital as non-initial features for the mappings of FIG. 1 are shown in line 106.

In one embodiment, the abbreviation system learns the weights of the various features by a regression method based on training data. Regression determines the relationship between two random variables $x=(x_1, x_2, \ldots, x_p)$ (i.e., the features) and y (i.e., the scores). A linear regression method explains the relationship between x and y with a straight line fit to the training data. The linear regression method postulates that:

$$y = b_0 + \sum_{j=1}^{p} b_j x_j + e \tag{1}$$

where the "residual" e is a random variable with a mean of zero and the coefficients $b_j (0 \leq j \leq p)$ are determined by the condition that the sum of the square of the residuals is as small as possible. Therefore, the linear combination with $b_j$ should be better than those with any other coefficients. Alternatively, the abbreviation system may use a logistics regression technique. A logistic function models the relationship between features and scores by transforming probabilities. A logistic function generates a value between 0 and 1 with an S-shaped curve. The initial growth of the curve is approximately exponential, which slows over time. The abbreviation system may represent the logistic function by the following equation:

$$\text{logit}(q) = \log(q/(1-q)) = b_0 + \sum_{j=1}^{p} b_j x_j + e \tag{2}$$

where q represents a value between 0 and 1. The abbreviation system uses a maximum likelihood method to select weights that maximize the probability of getting the scores. Alternatively, the abbreviation system may use support vector regression to learn the weights. Support vector regression operates by finding a hyper-surface in the space of possible inputs. The hyper-surface attempts to split the positive examples (e.g., features of candidate expansions with high scores) from the negative examples (e.g., features of candidate expansions with low scores) by maximizing the distance between the nearest of the positive and negative examples to the hyper-surface. Support vector regression applies a loss function represented by the following:

$$L_\varepsilon(y, f(x, \omega)) = \begin{cases} 0 & \text{if } |y - f(x, \omega)| \leq \varepsilon \\ |y - f(x, \omega)| - \varepsilon & \text{otherwise} \end{cases} \tag{3}$$

where $\|\omega\|^2$ represents the criterion to be optimized. By introducing non-negative variables $\zeta_i, \zeta^*_i$ with i=1,2,n, the deviation of training samples outside the $\epsilon$ insensitive zone can be calculated. Thus, support vector regression is formalized as minimization of the following function:

$$\min \frac{1}{2}\|\omega\|^2 + C \sum_{i=1}^{n} (\xi_i + \xi_i^*) \tag{4}$$

$$s.t. \begin{cases} y_i - f(x, \omega) \leq \varepsilon + \xi_i^* \\ f(x_i, \omega) - y_i \leq \varepsilon + \xi_i \\ \xi_i, \xi_i^* \geq 0, i = 1, \ldots, n \end{cases}$$

Figure 2:
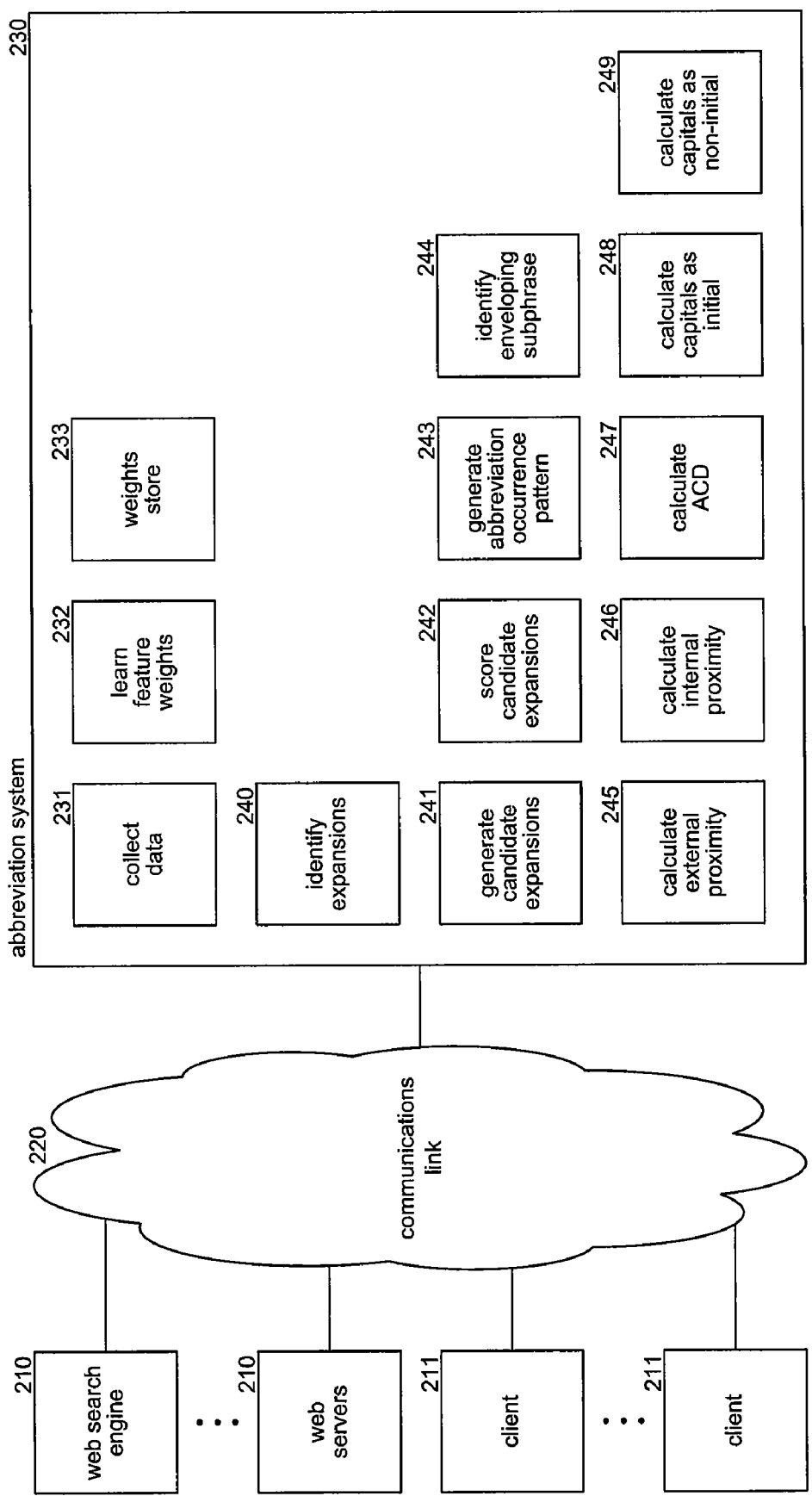
FIG. 2 is a block diagram that illustrates components of the abbreviation system in one embodiment.

FIG. 2 is a block diagram that illustrates components of the abbreviation system in one embodiment. The abbreviation system 230 may be connected to various server systems 210 and client systems 211 via communications link 220. The server systems may include web search engine servers and web page servers. The abbreviation system includes components for learning the weights for the features. The components include a collect data component 231, a learn feature weights component 232, and a weights store 233. The collect data component may submit various abbreviations as queries to a search engine service and stores the resulting snippets as training data. The learn feature weights component identifies candidate expansions from the snippets, generates features for the candidate expansions, and inputs scores indicating the correctness of candidate expansions. The learn feature weights component then applies a regression technique to learn the weights for the features. The component stores the weights of these features in the weights store. The abbreviation system also includes components to identify expansions for a given abbreviation. The abbreviation system includes an identify expansions component 240, a generate candidate expansions component 241, a score candidate expansions component 242, a generate abbreviation occurrence pattern component 243, an identify enveloping sub-phrase component 244, a calculate external proximity component 245, a calculate internal proximity component 246, a calculate abbreviation character distribution component 247, a calculate capitals as initial component 248, and a calculate capitals as non-initial component 249. These components are described below in detail.

The computing device on which the abbreviation system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the abbreviation system, which means a computer-readable medium contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the abbreviation system may be implemented in various operating environments that include personal computers, server computers, hand-held or laptop devices, multiprocessor systems, microprocessor-based systems, programmable consumer electronics, digital cameras, network PCs, minicomputers, mainframe computers, cell phones, personal digital assistants, smart phones, personal computers, programmable consumer electronics, distributed computing environments that include any of the above systems or devices, and so on.

The abbreviation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
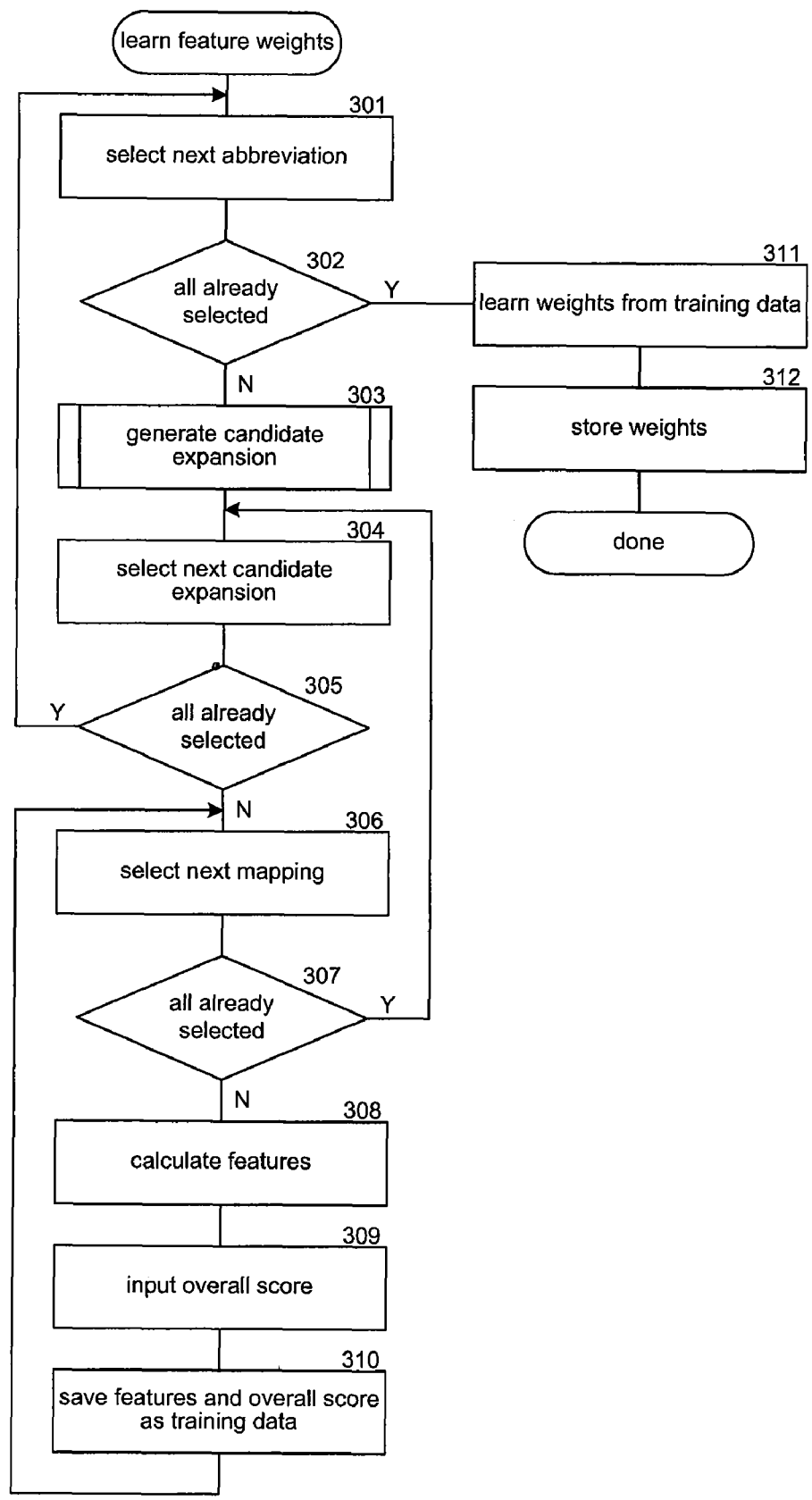
FIG. 3 is a flow diagram that illustrates the processing of the learn feature weights component of the abbreviation system in one embodiment.

FIG. 3 is a flow diagram that illustrates the processing of the learn feature weights component of the abbreviation system in one embodiment. The component is provided with abbreviations, passages, and scores and learns weights for mapping the features to the scores. In block 301, the component selects the next abbreviation of the training data. In decision block 302, if all the abbreviations have already been selected, then the component continues at block 311, else the component continues at block 303. In block 303, the component invokes the generate candidate expansions component to generate candidate expansions from the passages for the selected abbreviation. In block 304, the component selects the next candidate expansion. In decision block 305, if all the candidate expansions have already been selected, then the component loops to block 301 to select the next abbreviation, else the component continues at block 306. In block 306, the component selects the next mapping for the selected abbreviation to the selected candidate expansion. In decision block 307, if all the mappings have already been selected, then the component loops to block 304 to select the next candidate expansion, else the component continues at block 308. In block 308, the component calculates the features for the selected mapping. In block 309, the component inputs an overall score for the mapping. In block 310, the component saves the features and the overall score for use in training. The component then loops to block 306 to select the next mapping. In block 311, the component learns the weights for the features from the training data. In block 312, the component stores the weights in the weights store and then completes.

Figure 4:
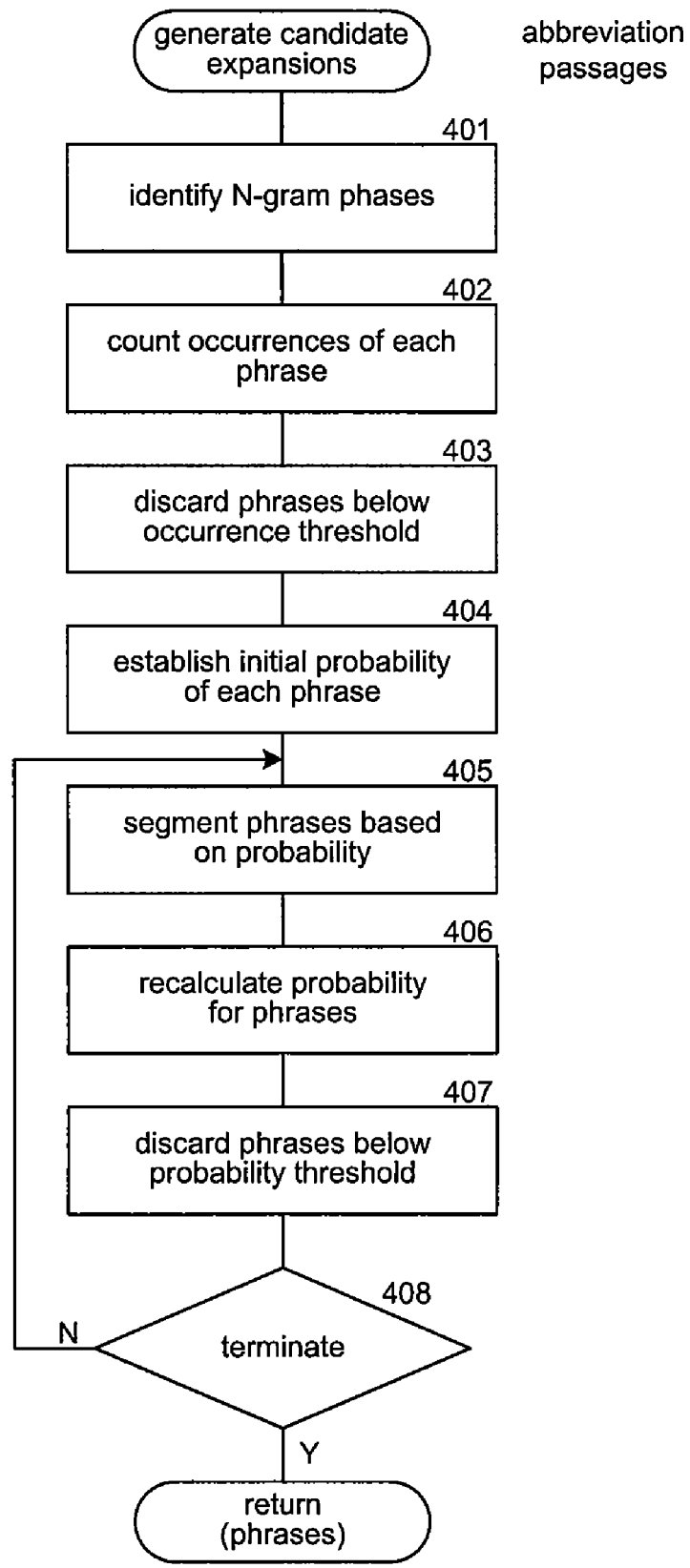
FIG. 4 is a flow diagram that illustrates the high-level processing of the generate candidate expansions component of the abbreviation system in one embodiment.

FIG. 4 is a flow diagram that illustrates the high-level processing of the generate candidate expansions component of the abbreviation system in one embodiment. The component is passed an abbreviation and passages and returns candidate expansions of the abbreviation derived from the passages. In one embodiment, the component identifies candidate expansions from snippets using a language model to identify sequences of phrases with the highest probabilities. A technique for identifying candidate expansions is described in Shen, D., Sun, J., Yang, Q., Zhao, H., and Chen, Z., "Text Classification Improved Through Automatically Extracted Sequences," Proceedings of the 22$^{nd}$ International Conference on Data Engineering, 2006, which is hereby incorporated by reference. In block 401, the component identifies phrases within the passages up to a length of N. In block 402, the component counts the number of occurrences of each phrase. In block 403, the component discards phrases below an occurrence threshold. In block 404, the component establishes an initial probability for each phrase based on the number of occurrences of the phrase. In blocks 405-408, the component iterates identifying phrases with a high probability. In block 405, the component segments the phrases based on probabilities. In block 406, the component recalculates the probabilities of the phrases. In block 407, the component discards phrases below a probability threshold. In decision block 408, if the selection of phrases is complete, then the component returns the phrases, else the component loops to block 405 to perform another iteration.

Figure 5:
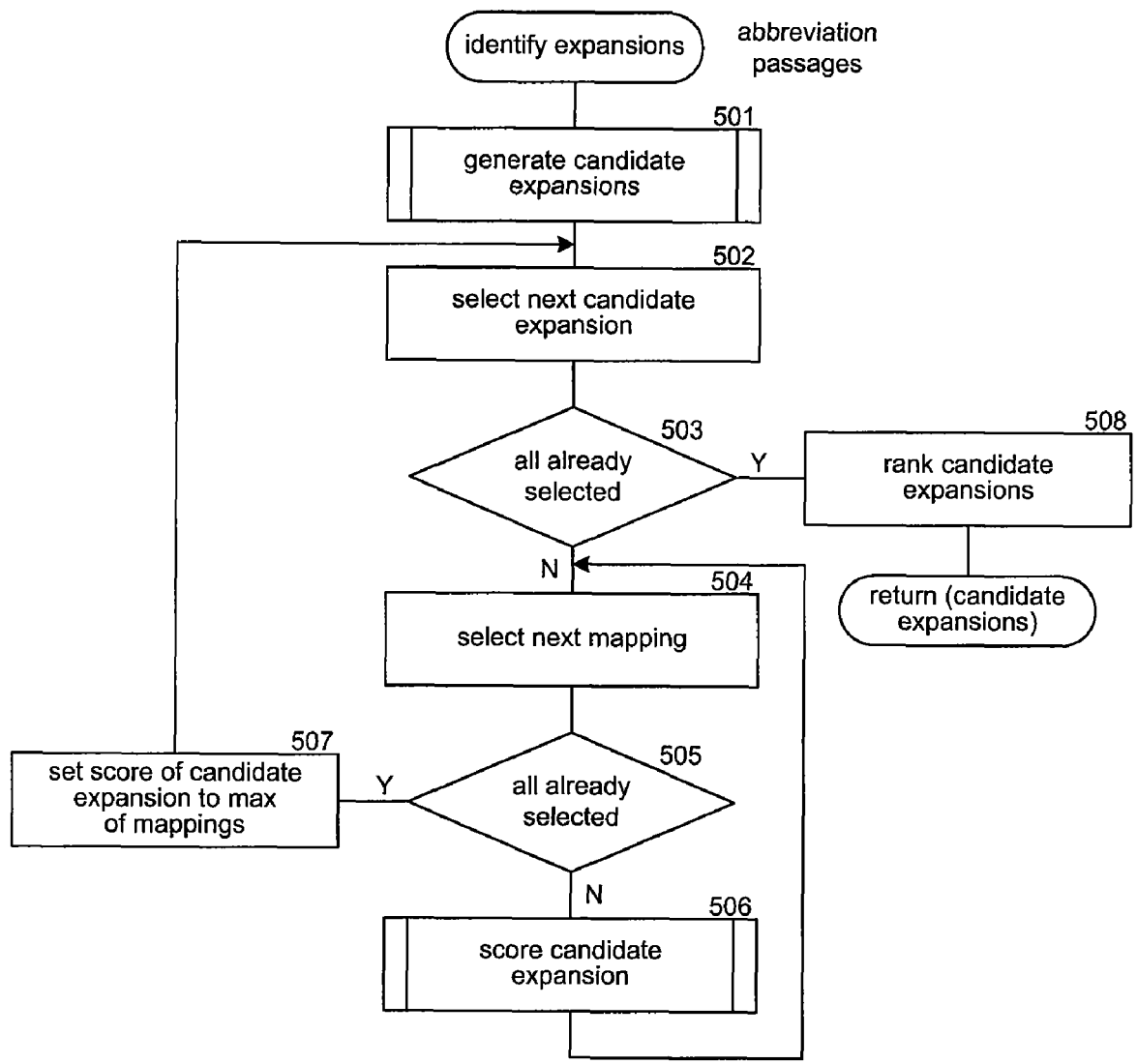
FIG. 5 is a flow diagram that illustrates the processing of the identify expansions component of the abbreviation system in one embodiment.

FIG. 5 is a flow diagram that illustrates the processing of the identify expansions component of the abbreviation system in one embodiment. The component is passed an abbreviation and passages and generates a ranking of the possible expansions of the abbreviation. In block 501, the component invokes the generate candidate expansions component to identify candidate expansions from the phrases. In block 502, the component selects the next candidate expansion. In decision block 503, if all the candidate expansions have already been selected, then the component continues at block 508, else the component continues at block 504. In blocks 504-506, the component loops scoring the mappings for the selected candidate expansion. In block 504, the component selects the next mapping. In decision block 505, if all the mappings have already been selected, then the component continues at block 507, else the component continues at block 506. In block 506, the component invokes the score candidate expansions component to score the candidate expansion for the selected mapping and then loops to block 504 to select the next mapping. In block 507, the component sets a score of the candidate expansion to the maximum of the scores of the mappings and then loops to block 502 to select the next candidate expansion. In block 508, the component ranks the candidate expansions based on their scores and then returns the ranked candidate expansions.

Figure 6:
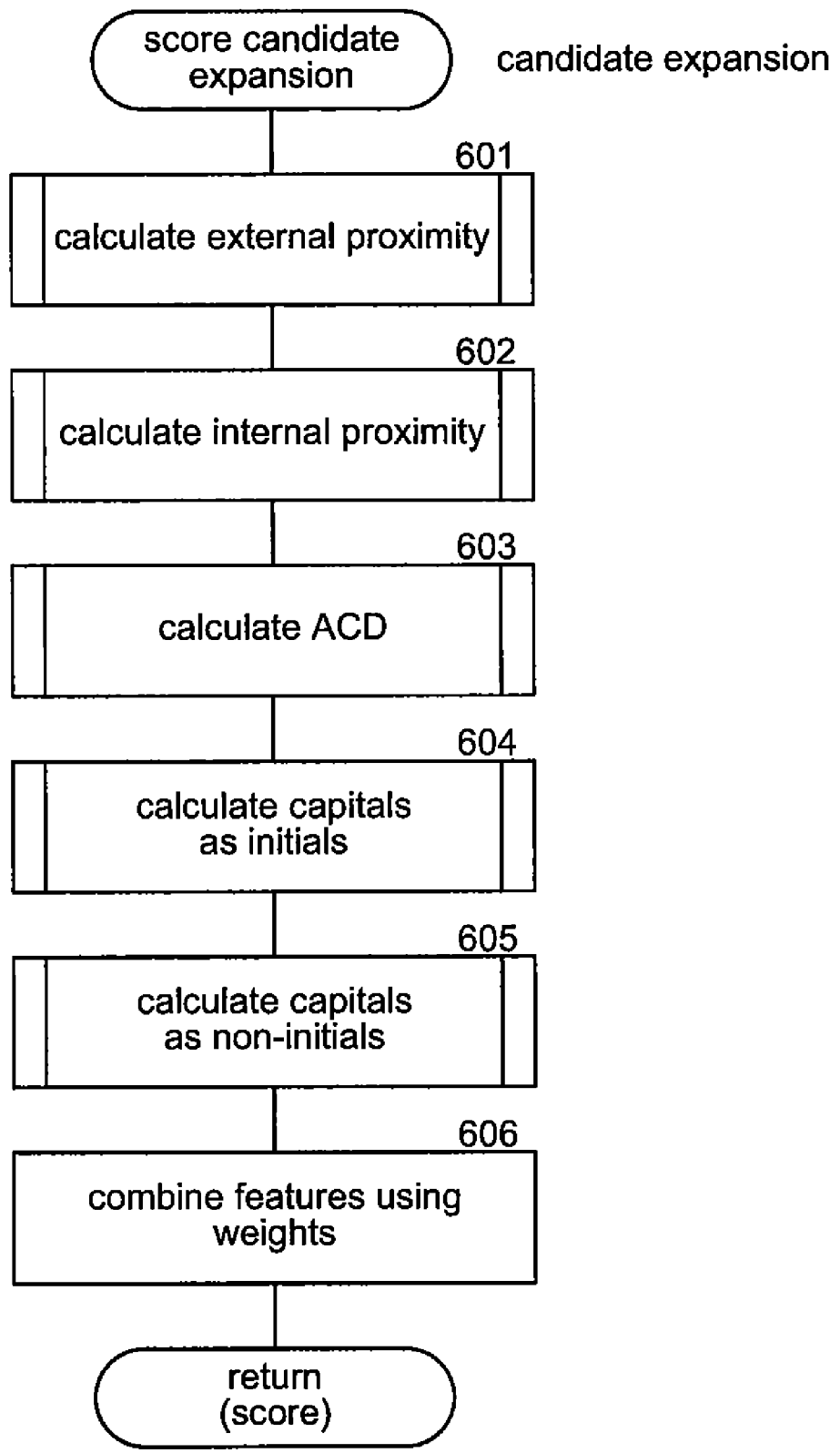
FIG. 6 is a flow diagram that illustrates the processing of the score candidate expansions component of the abbreviation system in one embodiment.

FIG. 6 is a flow diagram that illustrates the processing of the score candidate expansions component of the abbreviation system in one embodiment. The component is passed an abbreviation and a mapping of a candidate expansion and generates a score based on the features and their learned weights. In block 601, the component invokes the calculate external proximity component to calculate the external proximity feature for the candidate expansion. In block 602, the component invokes the calculate internal proximity component to calculate the internal proximity feature for the candidate expansion. In block 603, the component invokes the calculate abbreviation character distribution component to calculate the abbreviation character distribution feature for the candidate expansion. In block 604, the component invokes the calculate capitals as initial component to calculate the capital as initial feature of the candidate expansion. In block 605, the component invokes the calculate capitals as non-initial component to calculate the capital as non-initial feature of the candidate expansion. In block 606, the component combines the features using the learned weights to generate a score for the candidate expansion. The component then returns the score.

Figure 7:
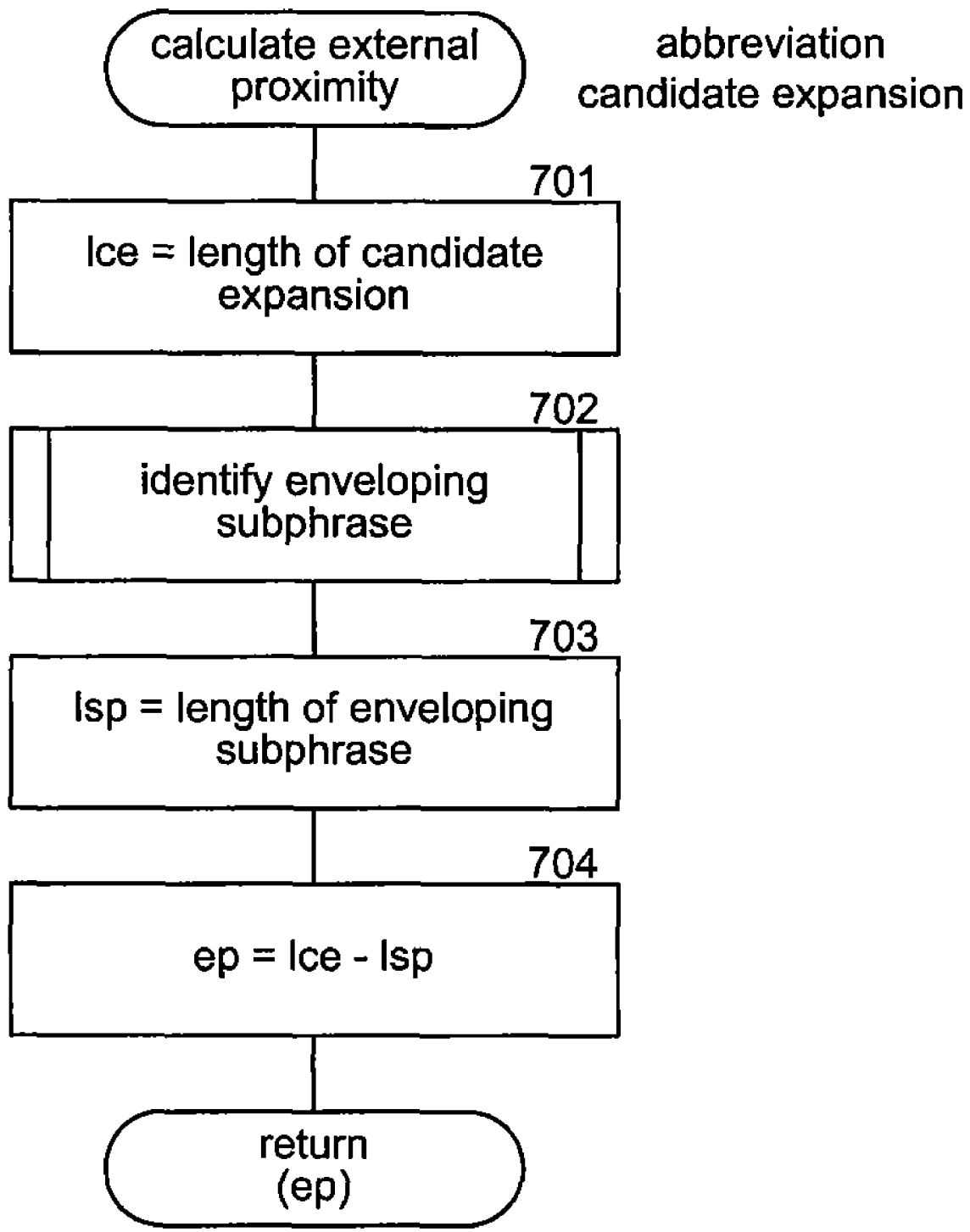
FIG. 7 is a flow diagram that illustrates the processing of the calculate external proximity component of the abbreviation system in one embodiment.

FIG. 7 is a flow diagram that illustrates the processing of the calculate external proximity component of the abbreviation system in one embodiment. The component is passed an abbreviation and a mapping to a candidate expansion and returns an external proximity feature. In block 701, the component sets the length of the candidate expansion to the number of words it contains. In block 702, the component invokes the identify enveloping sub-phrase component to identify the sub-phrase of the candidate expansion enveloped by the mapping. In block 703, the component calculates the length of the enveloping sub-phrase as the number of words it contains. In block 704, the component sets the external proximity feature to the difference between the length of the candidate expansion and the length of the enveloping sub-phrase. The component then returns.

Figure 8:
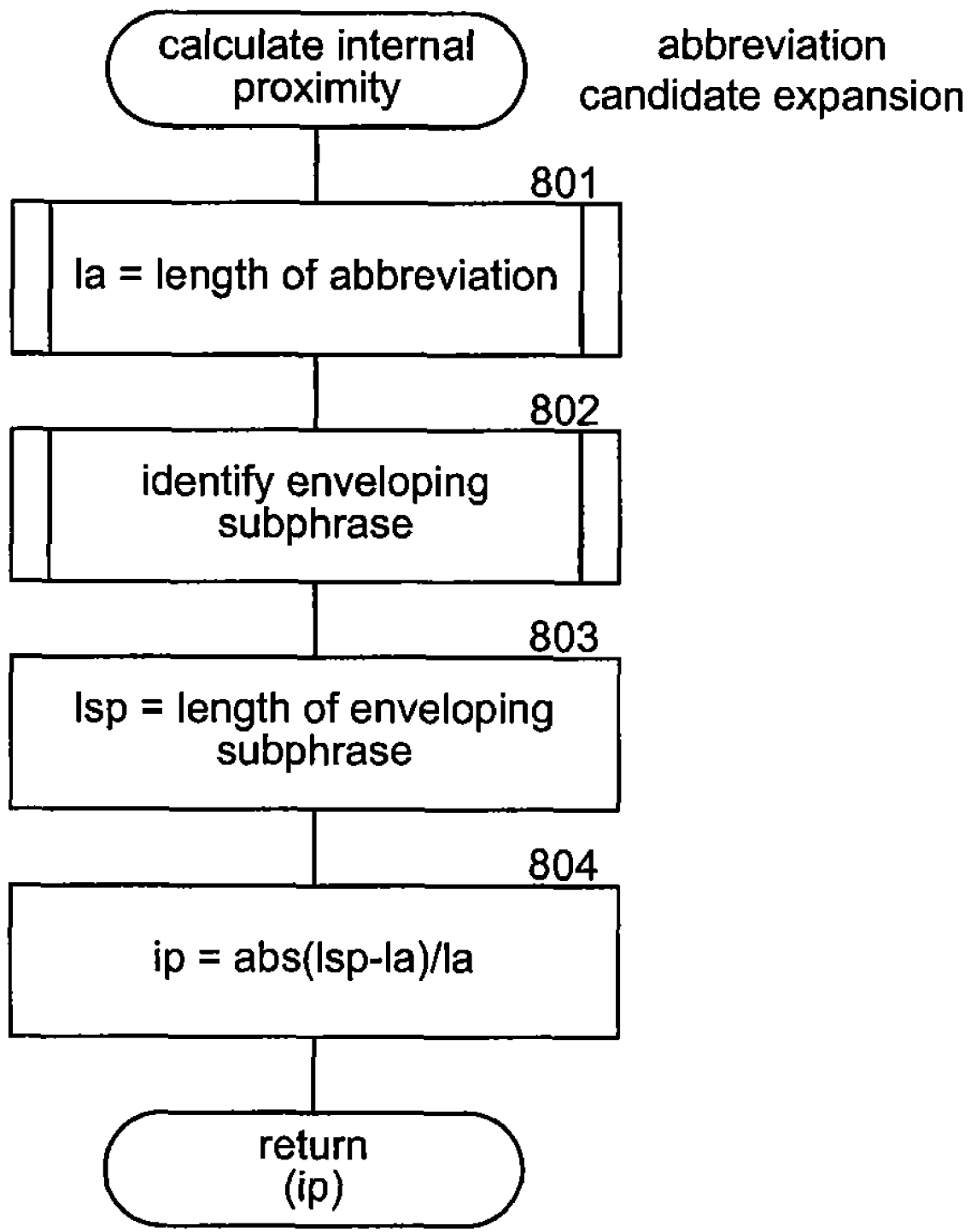
FIG. 8 is a flow diagram that illustrates the processing of the calculate internal proximity component of the abbreviation system in one embodiment.

FIG. 8 is a flow diagram that illustrates the processing of the calculate internal proximity component of the abbreviation system in one embodiment. The component is passed an abbreviation and a mapping to a candidate expansion and returns the internal proximity feature. In block 801, the component sets the length of the abbreviation to the number of letters in the abbreviation. In block 802, the component invokes the identify enveloping sub-phrase component to identify the sub-phrase enveloped by the mapping. In block 803, the component sets the length of the sub-phrase to the number of words in the enveloping sub-phrase. In block 804, the component sets the internal proximity feature to the absolute value of the difference between the length of the sub-phrase and the length of the abbreviation divided by the length of the abbreviation. The component then returns the internal proximity features.

Figure 9:
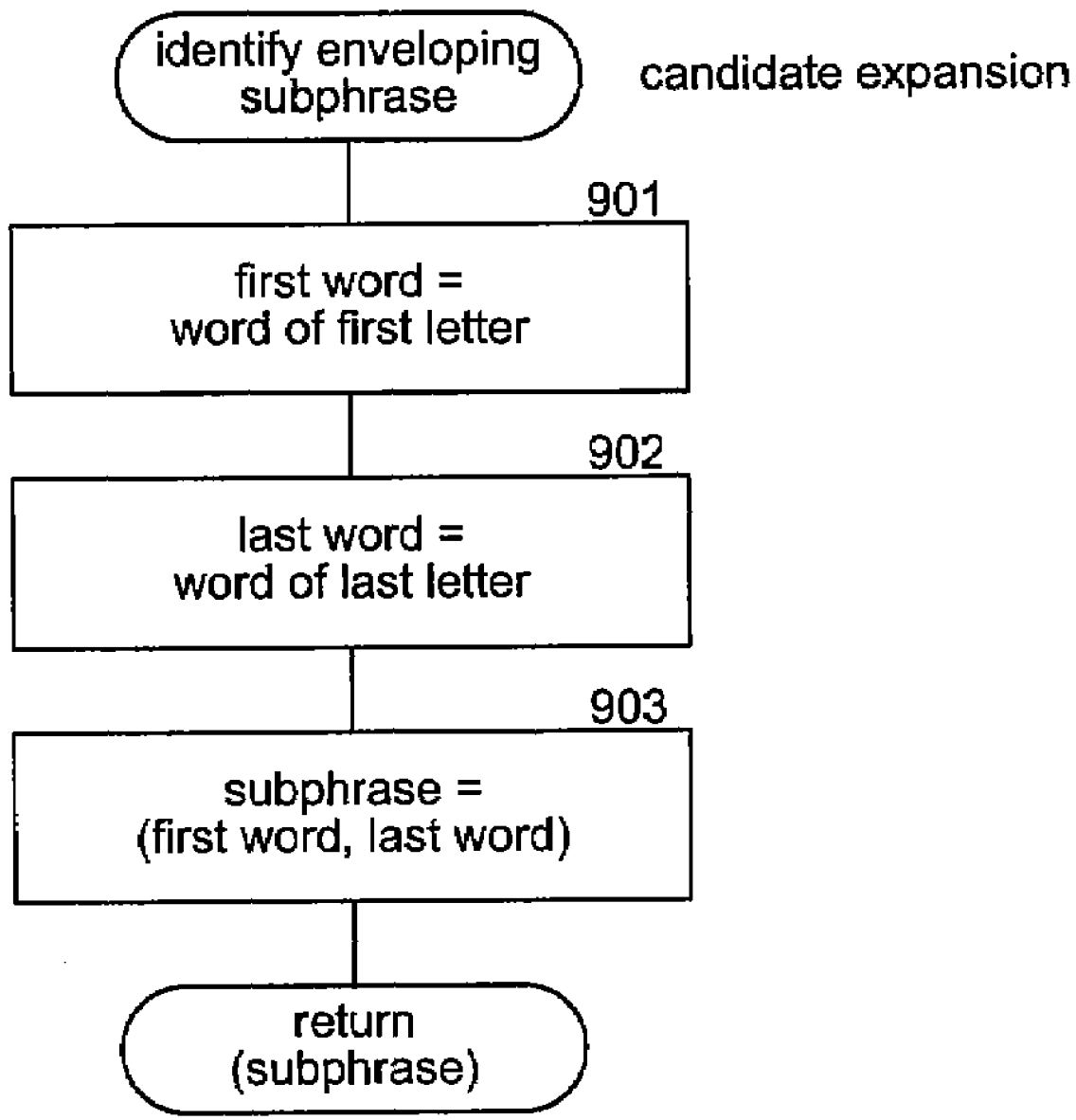
FIG. 9 is a flow diagram that illustrates the processing of the identify enveloping sub-phrase component of the abbreviation system in one embodiment.

FIG. 9 is a flow diagram that illustrates the processing of the identify enveloping sub-phrase component of the abbreviation system in one embodiment. The component is passed a mapping and identifies the first word and last word of the enveloping sub-phrase. In block 901, the component identifies the first word as the word of the candidate expansion that contains the first letter of the mapping. In block 902, the component sets the last word to the word of the candidate expansion that contains the last letter of the mapping. In block 903, the component sets a sub-phrase to the first word and the last word. The component then returns the sub-phrase.

Figure 10:
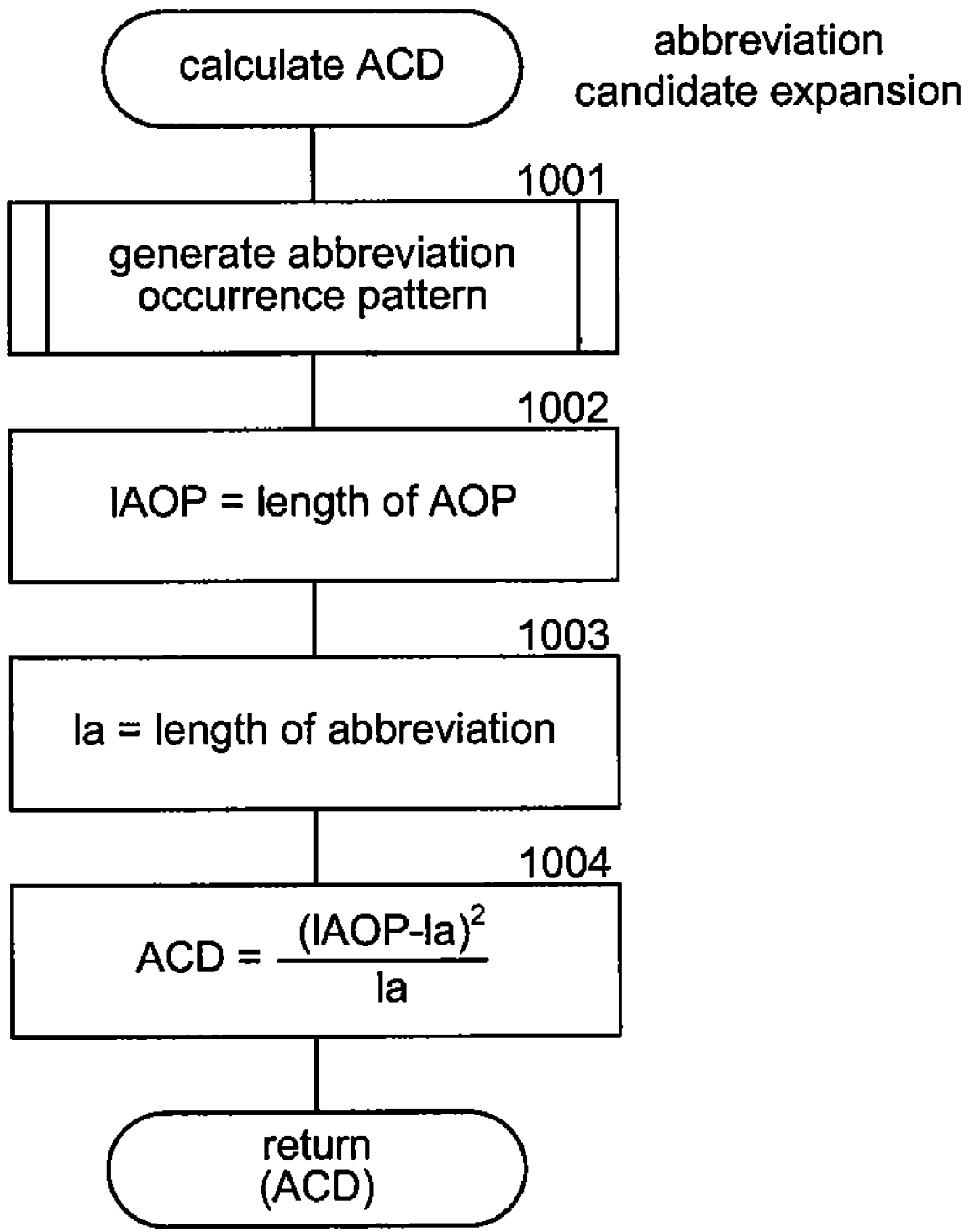
FIG. 10 is a flow diagram that illustrates the processing of the calculate abbreviation character distribution component of the abbreviation system in one embodiment.

FIG. 10 is a flow diagram that illustrates the processing of the calculate abbreviation character distribution component of the abbreviation system in one embodiment. The component is passed an abbreviation and a mapping for a candidate expansion and returns the abbreviation character distribution feature. In block 1001, the component invokes the generate abbreviation occurrence pattern component to identify the abbreviation occurrence pattern. In block 1002, the component sets the length of the abbreviation occurrence pattern to the number of characters in the abbreviation occurrence pattern. In block 1003, the component sets the length of the abbreviation to the number of letters in the abbreviation. In block 1004, the component sets the abbreviation character distribution feature to the square of the difference between the length of the abbreviation occurrence pattern minus the length of the abbreviation, divided by the length of the abbreviation. The component then returns the abbreviation character distribution feature.

Figure 11:
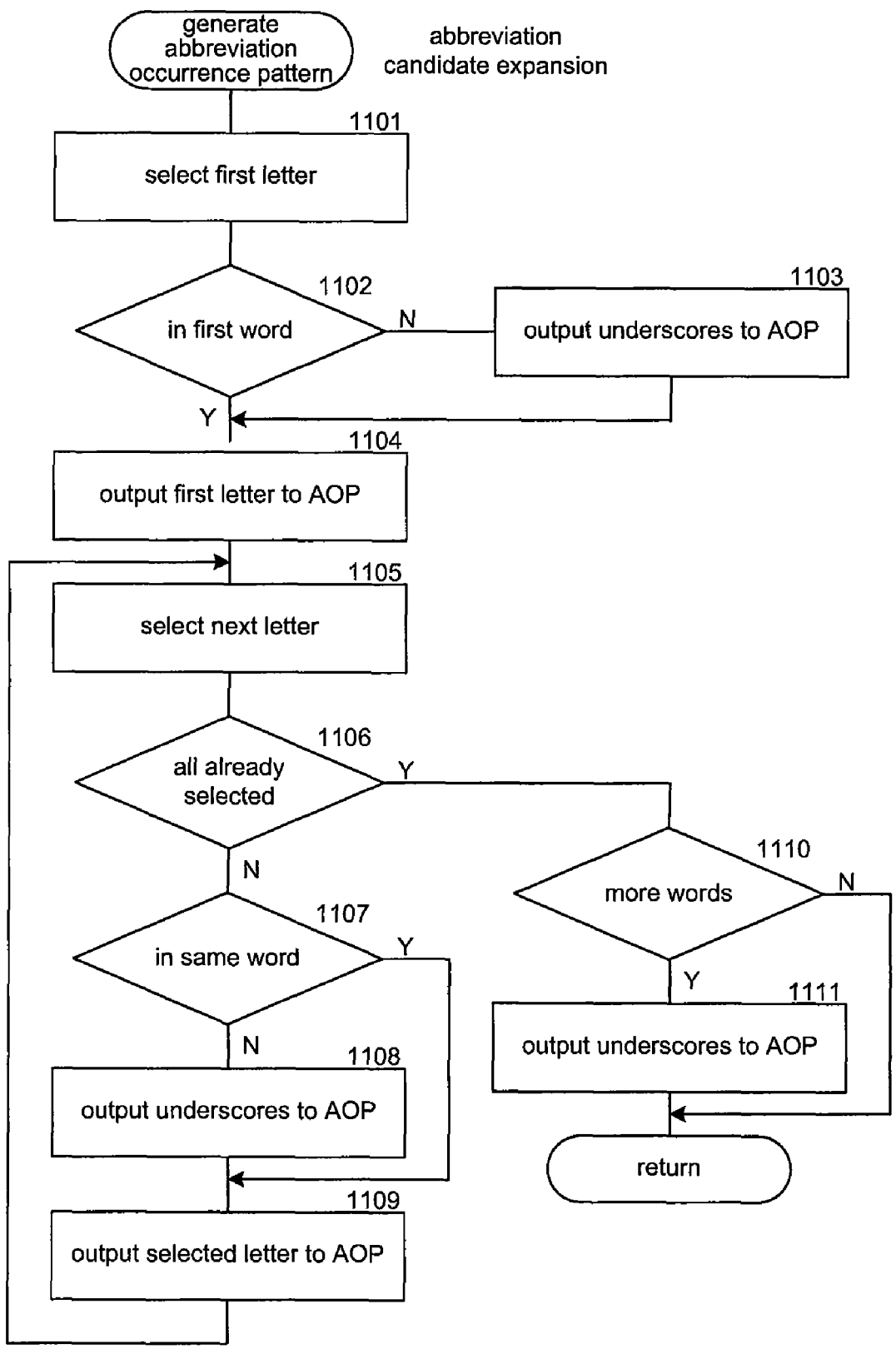
FIG. 11 is a flow diagram that illustrates the processing of the generate abbreviation occurrence pattern component of the abbreviation system in one embodiment.

FIG. 11 is a flow diagram that illustrates the processing of the generate abbreviation occurrence pattern component of the abbreviation system in one embodiment. The component is passed an abbreviation and a mapping of a candidate expansion and returns the abbreviation occurrence pattern. In block 1101, the component selects the first letter of the abbreviation. In decision block 1102, if the first letter is within the first word, then the component continues at block 1104, else the component continues at block 1103. In block 1103, the component outputs underscore(s) to the abbreviation occurrence pattern for the first word(s) of the candidate expansion that does not contain the first letter of the abbreviation. In block 1104, the component outputs the first letter of the abbreviation to the abbreviation occurrence pattern. In block 1105, the component selects the next letter of the abbreviation. In decision block 1106, if all the letters of the abbreviation have already been selected, then the component continues at block 1110, else the component continues at block 1107. In decision block 1107, if the selected letter is within the same word as the previously selected letter, then the component continues at block 1109, else the component continues at block 1108. In block 1108, the component outputs underscore(s) to the abbreviation occurrence pattern for the next word(s) that does not contain the selected letter. In block 1109, the component outputs the selected letter to the abbreviation occurrence pattern and then loops to block 1105 to select the next letter. In decision block 1110, if there are more words in the candidate expansion, then the component continues at block 1111, else the component returns the abbreviation occurrence pattern. In block 1111, the component outputs underscore(s) for the remaining word(s) of the candidate expansion to the abbreviation occurrence pattern and then returns the abbreviation occurrence pattern.

Figure 12:
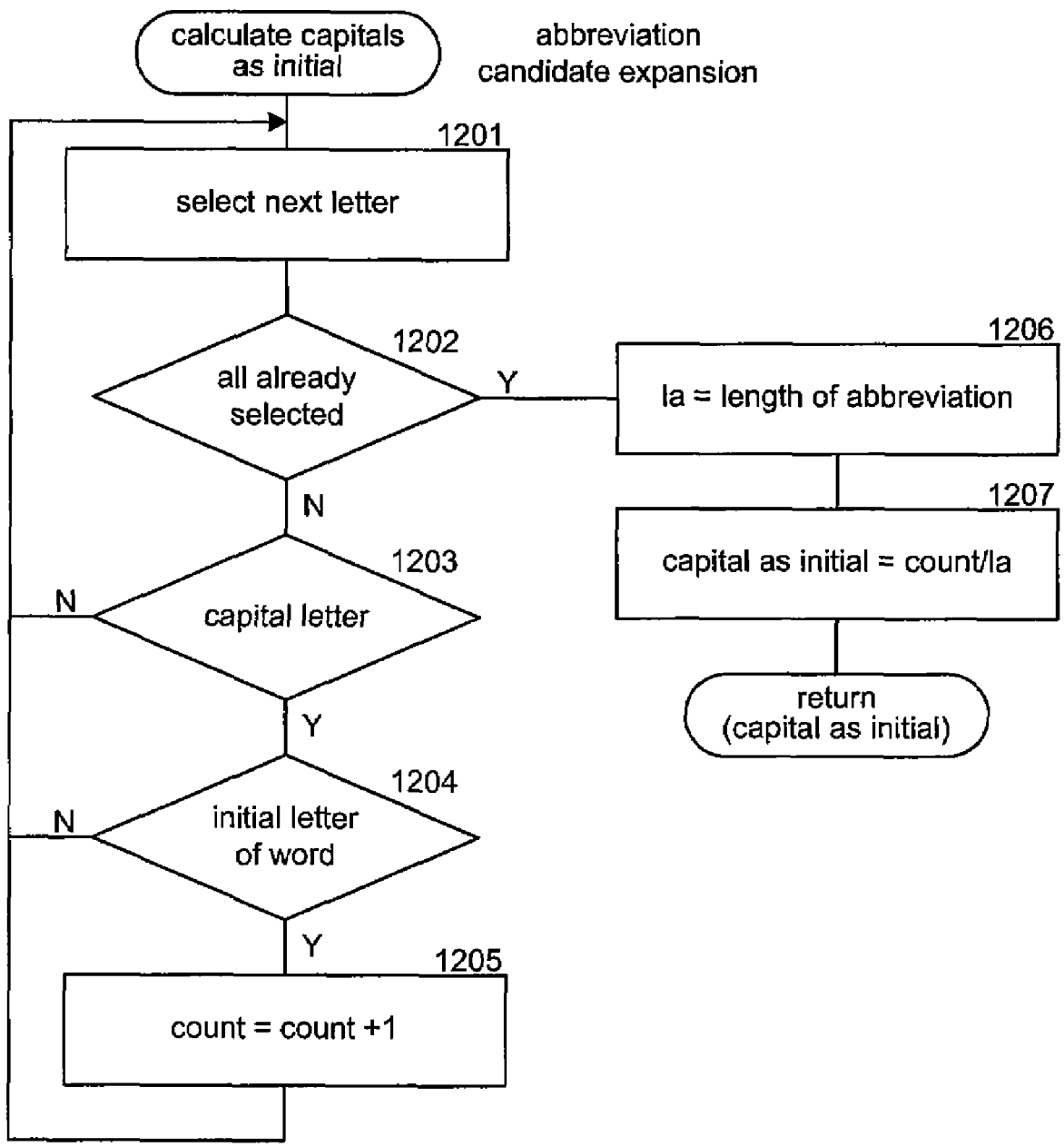
FIG. 12 is a flow diagram that illustrates the processing of the calculate capitals as initial component of the abbreviation system in one embodiment.

FIG. 12 is a flow diagram that illustrates the processing of the calculate capitals as initial component of the abbreviation system in one embodiment. The component is passed an abbreviation and a mapping to a candidate expansion and returns the capital as initial feature. In block 1201, the component selects the next letter of the abbreviation. In decision block 1202, if all the letters have already been selected, then the component continues at block 1206, else the component continues at block 1203. In decision block 1203, if the selected letter is a capital letter, then the component continues at block 1204, else the component loops to block 1201 to select the next letter. In decision block 1204, if the selected letter is the initial letter of the word according to the mapping, then the component continues at block 1205, else the component loops to block 1201 to select the next letter. In block 1205, the component increments the count of the capitals of the abbreviation that are initial letters of words in the mapping and then loops to block 1201 to select the next letter. In block 1206, the component sets the length of the abbreviation to the number of letters in the abbreviation. In block 1207, the component sets the capital as initial feature to the count divided by the length of the abbreviation and then returns the capital as initial feature.

Figure 13:
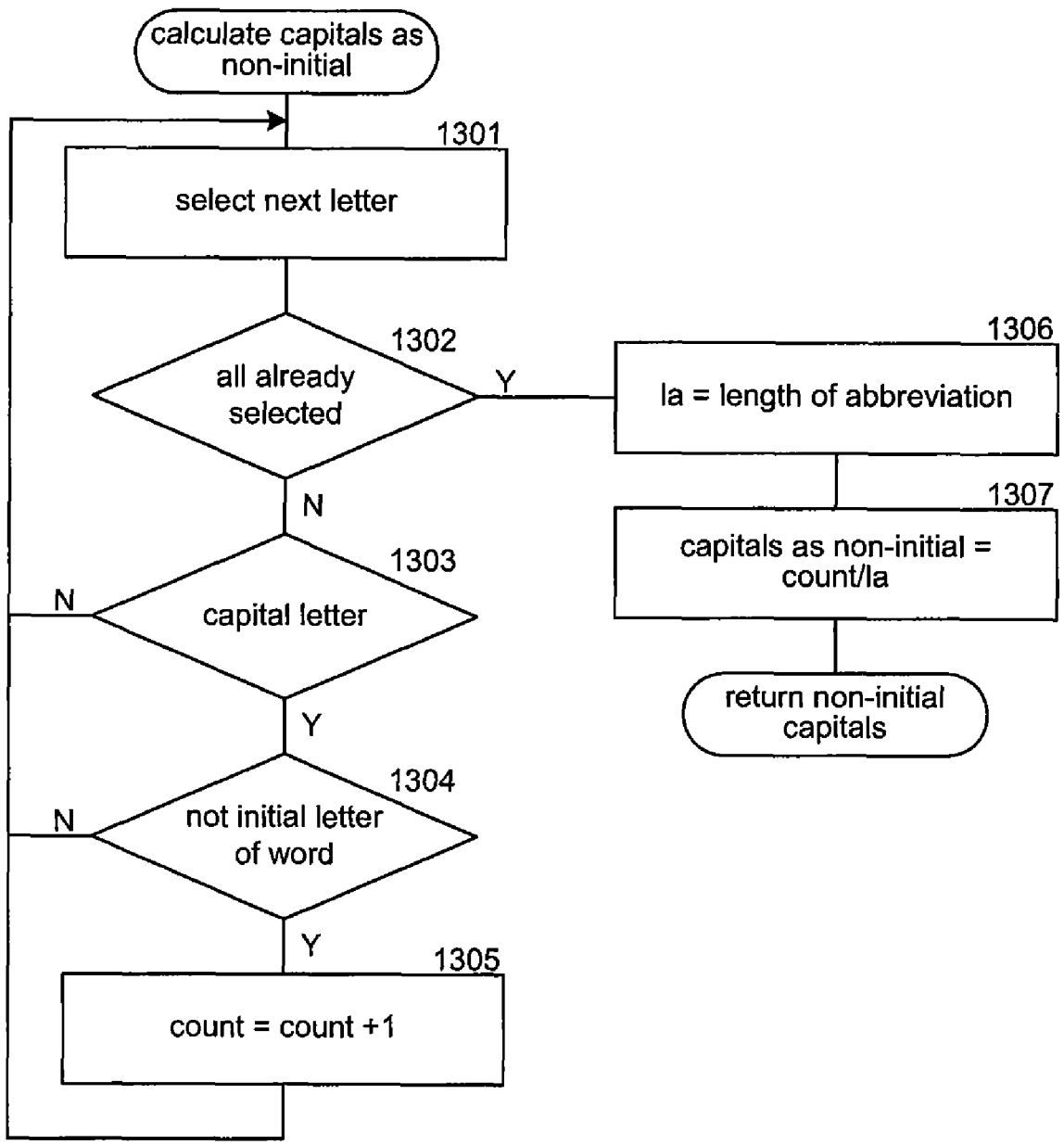
FIG. 13 is a flow diagram that illustrates the processing of the calculate capitals as non-initial component of the abbreviation system in one embodiment.

FIG. 13 is a flow diagram that illustrates the processing of the calculate capitals as non-initial component of the abbreviation system in one embodiment. The component is passed an abbreviation and a mapping to a candidate expansion and returns the capital as non-initial feature. In block 1301, the component selects the next letter of the abbreviation. In decision block 1302, if all the letters have already been selected, then the component continues at block 1306, else the component continues at block 1303. In decision block 1303, if the selected letter is a capital letter, then the component continues at block 1304, else the component loops to block 1301 to select the next letter. In decision block 1304, if the selected letter is not the initial letter of the word according to the mapping, then the component continues at block 1305, else the component loops to block 1301 to select the next letter. In block 1305, the component increments the count of the capitals of the abbreviation that are not initial letters of words in the mapping and then loops to block 1301 to select the next letter. In block 1306, the component sets the length of the abbreviation to the number of letters in the abbreviation. In block 1307, the component sets the capital as non-initial feature to the count divided by the length of the abbreviation and then returns the capital as non-initial feature.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. One skilled in the art will appreciate that many different features may be used to represent the relationships between an abbreviation and a candidate expansion. The abbreviation system can be used to learn the weights for features irrespective of how the features are defined. Accordingly, the invention is not limited except as by the appended claims.

We claim:

1. A computer system for identifying expansions of abbreviations, comprising:
    a component that learns weights of features of abbreviation expansions, the weights representing effectiveness of a feature at indicating correctness of an abbreviation expansion;
    a component that receives an abbreviation;
    a component that identifies passages by
        submitting the abbreviation as a query to a search engine service; and
        receiving from the search engine service search results, the search results including references to documents relating to the abbreviation and including, for each referenced document, a snippet of text extracted from the referenced document, the snippets being the identified passages;
    a component that identifies from the passages candidate expansions of the abbreviation;
    a component that generates features for the candidate expansions; and
    a component that generates a score indicating correctness of a candidate expansion for the abbreviation by combining the generated features for a candidate expansion using the learned weights of the features.

2. The computer system of claim 1 wherein the component that learns weights inputs abbreviations and passages for each abbreviation, identifies candidate expansions from passages for each abbreviation, generates features of the candidate expansions, and inputs an indication of correctness of candidate expansions.

3. The computer system of claim 2 wherein the features and the indications of correctness of the candidate expansions form training data for learning the weights of the features.

4. The computer system of claim 1 wherein the component that learns weights applies a linear regression technique.

5. The computer system of claim 1 wherein the component that learns weights applies a logistics regression technique.

6. The computer system of claim 1 wherein the component that learns weights applies a support vector regression technique.

7. The computer system of claim 1 wherein the features are selected from a group consisting of an external proximity feature, an internal proximity feature, an abbreviation character distribution feature, a capital as initial feature, and a capital as non-initial feature.

8. The computer system of claim 1 wherein the component that learns weights inputs abbreviations and passages for each abbreviation, identifies candidate expansions from passages for each abbreviation, generates features of the candidate expansions, and inputs an indication of correctness of candidate expansions such that the features and the indications of correctness of the candidate expansions form training data for learning the weights of the features and wherein the features are selected from a group consisting of an external proximity feature, an internal proximity feature, an abbreviation character distribution feature, a capital as initial feature, and a capital as non-initial feature.

9. A computer-readable medium encoded with instructions for controlling a computing system to identify expansions of abbreviations, by a method comprising:
    providing weights of features of abbreviation expansions, the weights representing effectiveness of a feature at indicating correctness of an abbreviation expansion and being learned from training data, the features include features selected from a group consisting of an external proximity feature and an internal proximity feature, the external proximity feature for a candidate abbreviation expansion representing a difference between the number of words in the candidate abbreviation expansion and the number of words enveloping a mapping of letters of the abbreviation to letters of the candidate abbreviation expansion, the internal proximity feature for a candidate abbreviation expansion representing an absolute value of a difference between the number of words in the candidate abbreviation expansion and the number of letters in the abbreviation;
    identifying candidate expansions of an abbreviation from passages;
    generating features of the candidate expansions; and
    generating a score indicating correctness of a candidate expansion for the abbreviation by combining the generated features for a candidate expansion using the provided weights of the features.

10. The computer-readable medium of claim 9 including learning the weights by identifying candidate expansions from passages for abbreviations, generating features of the candidate expansions, and inputting indications of correctness of candidate expansions.

11. The computer-readable medium of claim 10 wherein the features and the indications of correctness of the candidate expansions form training data for learning the weights of the features.

12. The computer-readable medium of claim 9 wherein the weights are learned using a technique selected from the group consisting of linear regression, logistics regression, and support vector regression.

13. The computer-readable medium of claim 9 wherein a feature is an abbreviation character distribution feature.

14. The computer-readable medium of claim 9 wherein a feature is a capital as initial feature.

15. The computer-readable medium of claim 9 wherein a feature is a capital as non-initial feature.

16. A method in a computer system for generating weights for expansions of abbreviations, comprising:

providing abbreviations and passages;
identifying candidate expansions from passages for each abbreviation;
generating by the computer system features of the candidate expansions, the features including an abbreviation character distribution feature representing a normalized square of a difference between a length of an abbreviation occurrence pattern and a number of letters in the abbreviation, the normalizing being the square of the difference divided by the number of letters in the abbreviation, the length of the abbreviation occurrence pattern for a mapping of an abbreviation to a candidate abbreviation expansion being a sum of the number of letters in the abbreviation plus the number of transitions between words of the mapping;
inputting indications of correctness of candidate expansions;
learning by the computer system weights for the features based on the generated features and input indications; and
storing the learned weights for scoring candidate expansions of abbreviations.

17. The method of claim 16 including:

receiving an abbreviation and passages;

identifying from the passages candidate expansions of the abbreviation;

generating features for the candidate expansions; and generating scores indicating correctness of the candidate expansions for the abbreviation by combining the generated features for the candidate expansions using the learned weights of the features.

* * * * *